United States Patent [19]

Morell et al.

[11] Patent Number: 5,783,107
[45] Date of Patent: Jul. 21, 1998

[54] METHOD FOR THE MANUFACTURE OF A LUMINOPHORE

[75] Inventors: Antoinette Morell; Annie Marx, both of Villebon S/Yvette, France

[73] Assignee: Thomson-CSF, Paris, France

[21] Appl. No.: 762,801

[22] Filed: Dec. 9, 1996

[30] Foreign Application Priority Data

Dec. 8, 1995 [FR] France .................. 95 14544

[51] Int. Cl.[6] ............ C09K 11/01; C09K 11/59; C09K 11/54
[52] U.S. Cl. .............. 252/301.6 R; 252/301.6 R; 252/301.4 R
[58] Field of Search ................ 252/301.6 R, 301.4 R, 252/301.6 F

[56] References Cited

U.S. PATENT DOCUMENTS

| | | | |
|---|---|---|---|
| 3,040,202 | 6/1962 | Lehmann | 252/301.4 R |
| 5,518,655 | 5/1996 | Morell et al. | 252/301.4 F |
| 5,611,961 | 3/1997 | Forster et al. | 252/301.4 R |

FOREIGN PATENT DOCUMENTS

| | | |
|---|---|---|
| 2 719 850 | 11/1995 | France . |
| WO 93/25630 | 12/1993 | WIPO . |

*Primary Examiner*—Melissa Bonner
*Attorney, Agent, or Firm*—Oblon, Spivak, McClelland, Maier & Neustadt, P.C.

[57] ABSTRACT

A method for the manufacture of a luminophore comprising the following steps:

a) the weighing of the different constituent materials in powder form;
b) mixing in an aqueous medium;
c) the evaporation of the liquid;
d) the screening of the powder at 100 μm;
e) baking at a temperature of 1100° C. to 1400° C. in a neutral gas atmosphere with injection of neutral gas into the interior of the powder;
f) the screening of the baked powder;
g) crushing to reduce the size of the grains and then screening;
h) the annealing of the crushed powder at a temperature of 700° C. to 1200° C. so as to obtain a reorganization of the first atomic layers of the grains of the powder;
i) the mixing of the annealed powder in an aqueous medium, and sedimentation and then removal of the upper part of the liquid containing the powder in suspension;
j) the drying of the removed suspension and the screening of the powder obtained.

6 Claims, 1 Drawing Sheet

METHOD FOR THE MANUFACTURE OF A LUMINOPHORE

BACKGROUND OF THE INVENTION

The invention relates to a method for the manufacture of a luminophore (also called a phosphor) and especially a luminophore based on manganese-doped zinc silicate emitting in the green range of the spectrum and intended for display screens.

The rapid development of new screens for display requires the adapting and development of all the components and materials that form them. Thus, the luminescent materials known as phosphors which are responsible, under the effect of an excitation of electrons and photons, etc., for the emission of a light in the visible spectrum, need to have adapted characteristics, especially as regards saturation in the color considered, luminosity, decay time and grain size or particle diameter.

The present invention relates to a method of synthesis that can be used to obtain a luminophore that simultaneously has the optical and physical/chemical properties required for its use in display screens. The method relates to the synthesis of numerous luminophores for their use in the making of high-performance screens.

The method developed can be applied especially to the manufacture of a silicate-based luminophore with a general chemical formula $Zn_2SiO_4$:Mn. Under the effect of excitation by VUV (Vacuum UltraViolet) radiation, this luminophore sends out a green light whose highly saturated color composition (with little white) makes it a prime candidate for many applications such as plasma panel television.

There are known ways in the prior art of making a luminophore by obtaining a mixture of the constituent materials of the luminophore. The mixture is made in an aqueous medium to obtain a homogeneous mixture. The water is then evaporated. The powder obtained is screened and then baked in an oven and then screened again. However, despite all the care taken in these different operations, present-day luminophores are not entirely satisfactory.

Indeed, in plasma panels and for certain applications, the luminophore must have high luminous output, trichromatic coordinates (color composition) that are as saturated as possible, a decay time of less than 10 ms and a very narrow grain size distribution (with a mean size of 2 to 3 µm) in order to obtain a very high definition of the pixels and hence a very high resolution of the screen.

SUMMARY OF THE INVENTION

The invention therefore relates to a method for the manufacture of a luminophore comprising the following steps:

a) the weighing of the different constituent materials in powder form;

b) mixing in an aqueous medium;

c) the evaporation of the liquid;

d) the screening of the powder obtained (with a mesh aperture of 100 µm) to dis-agglomerate the powder;

e) baking at a temperature of 1100° C. to 1400° C. in a neutral gas atmosphere;

f) the screening of the baked powder;

g) crushing to reduce the size of the grains and then screening;

wherein the baking in a neutral gas atmosphere is done with the injection of neutral gas into the interior of the powder and wherein, after the crushing step, the method comprises the following steps:

h) the annealing of the crushed powder at a temperature in the region of 1000° C. so as to obtain a reorganization of the first atomic layers of the grains of the powder;

i) the mixing of the annealed powder in an aqueous medium, and sedimentation and then removal of the upper part of the liquid containing the powder in suspension;

j) the drying of the removed suspension and the screening of the powder that is left.

BRIEF DESCRIPTION OF THE DRAWINGS

The different objects and characteristics of the invention shall appear more clearly in the following description and in the appended figures, of which.

MORE DETAILED DESCRIPTION

Figure 1:
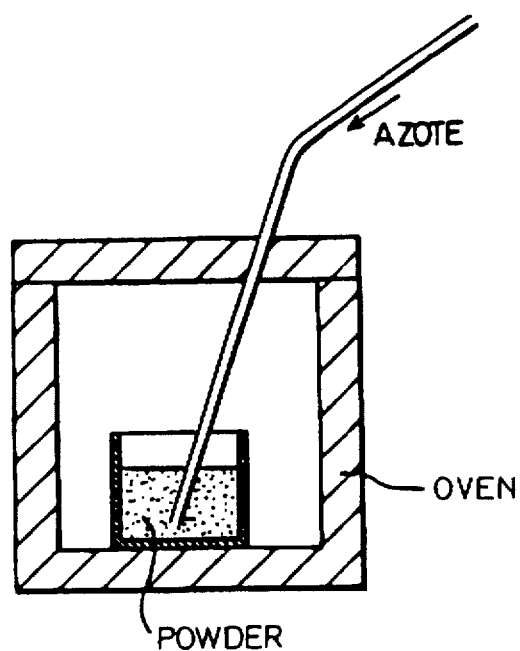
FIG. 1 shows a step for the injection of neutral gas into the powder during treatment.

The method of the invention comprises the following different steps:

the weighing of the different materials that go into the composition of the luminophore and the mixing of these materials in powder form in an aqueous solution so as to obtain a homogeneous mixture. To obtain manganese-doped zinc silicate, the following products are mixed in powder form: ZnO, $SiO_2$, manganese salt such as $MnSO_4$ or $MnCO_3$;

the evaporation of water under epiradiators and the finishing of the drying of the mixture in a stove at a temperature in the range of 100° C. so as to obtain a dry powder;

screening the powder obtained with a mesh aperture of 100 µm to disagglomerate the powder;

the screened powder is subjected to heat in an oven (for example made of alumina) at a temperature of 1100° C. to 1400° C. (1280° C. for example) for about four hours. During the baking, a neutral gas such as nitrogen is injected into the interior of the powder by means of a tube that plunges into the powder (see FIG. 1). The grains of powder are thus as far as possible heated in a confined nitrogen atmosphere. The purpose is to use this method to obtain a manganese doping during which the manganese is in a neutral environment such as nitrogen. Therefore, the risk is reduced in having an environment which, even if it is weakly oxygenated, may lead to the presence of manganese that is not luminescent. By the use of the device presented in FIG. 1, the luminance of a luminophore is thus increased;

the baked powder is again screened by means of a screen the mesh size of which is 100 µm;

to reduce the grain size, the powder is crushed in a mortar. For this purpose, a pestle and mortar made of agate is used and the operation may last for several hours (6 hours for example);

the crushed powder is again dried and then screened;

then the powder is annealed at a temperature of 700° C. to 1200° C. (1000° C. for example) for about 4 hours with again direct injection of nitrogen into the powder. This annealing is aimed at reorganizing the atomic surfaces of the grains for the previous crushing could have had the effect of damaging the grain surfaces;

after this annealing, the powder is again screened with a screen whose mesh aperture is about 100 µm;

the powder is mixed in an aqueous medium and a sedimentation is carried out along with an operation for the recovery, by suction for example, of the upper volume which then contains the finest grains in suspension;

the evaporation of the liquid from the recovered suspension, and then the drying and screening of the powder obtained.

Figure 2:
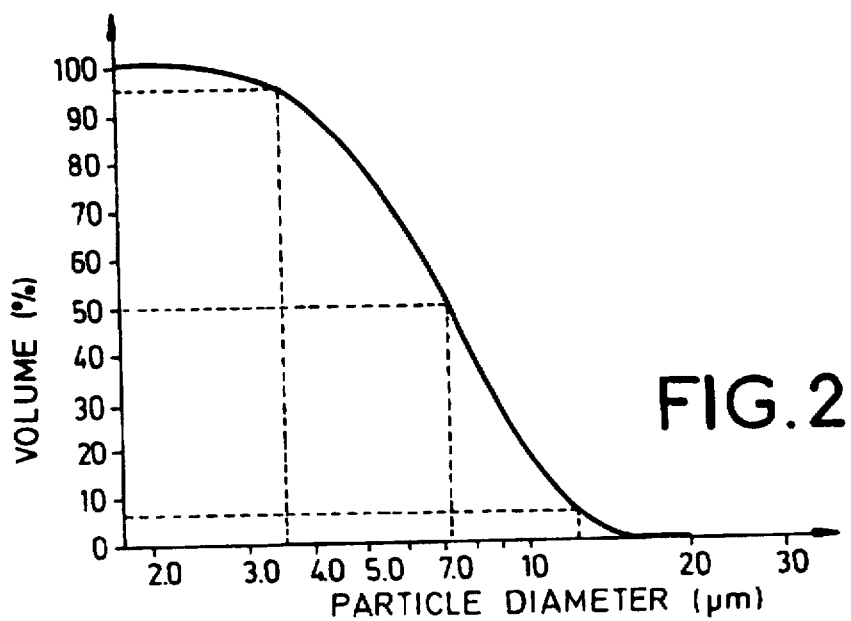
FIG. 2 shows a curve of distribution in volumes of sizes of grains of a luminophore.

The luminophore obtained is of the $Zn_2SiO_4$:Mn type and has the following characteristics:

light output: the output is greater than that of known luminophores and corresponds to 114% of the output for commercially available luminophores having the same general formula. However, these known luminophores have an excessively lengthy decay time (30 ms for example) and an excessively high grain size (6.5 µm for example);

trichromatic coordinates: X=0.25 Y=0.70;

decay time $\tau_{10}$ ≈ 6 ms; the decay time $\tau_{10}$ being the time at the end of which the maximum intensity of the transmission drops by a factor of 10 after all excitation has been cut off;

the mean size of the grains $\Phi_m$=2.5 µm with $\Phi_{95}/\Phi_5$ =1.7/5.4 µm and wherein $phi_{95}/phi_5$ represents the grain sizes at 95 and 5% in volume of the powder. The best known luminophore has grains with $\Phi_m$ =6.5 µm and $\Phi_{95}/\Phi_5$ =4.4/12 µm. FIG. 2 gives an exemplary view of the distribution in volume of the grain sizes of a luminophore in which 95% by volume ($\Phi_{95}$) is constituted by 3.5 µm grains, 5% ($\Phi_5$) is constituted by 12 µm grains and a mean volume $\Phi_m$ is constituted by 7.2 µm grains.

What is claimed is:

1. A method for the manufacture of a luminophore comprising the following steps:
   a) the weighing of the different constituent materials in the powder form;
   b) mixing in an aqueous medium;
   c) the evaporation of the liquid;
   d) the screening of the powder obtained with a mesh aperture of 100 µm to disagglomerate the powder;
   e) baking at a temperature of 1 100° C. to 1400° C. in a neutral gas atmosphere wherein neutral gas is injected into the interior of the powder;
   f) the screening of the baked powder;
   g) crushing to reduce the size of the grains and then screening;
   h) the annealing of the crushed powder at a temperature ranging from 700° C. to 1200° C. so as to obtain a reorganization of the first atomic layers of the grains of the powder;
   i) the mixing of the annealed powder in an aqueous medium, and sedimentation and then removal of the upper part of the liquid containing the powder in suspension;
   j) the drying of the removed suspension and the screening of the powder obtained.

2. A method according to claim 1, wherein the annealing step (h) is carried out in a neutral gas atmosphere.

3. A method according to claim 2, wherein the annealing step is carried out with the injection of neutral gas into the interior of the powder.

4. A method according to claim 1, wherein the materials used in the first step are ZnO, $SiO_2$, and manganese salt and wherein the luminophore is manganese-doped $Zn_2SiO_4$.

5. A method according to claim 1, wherein the neutral gas is nitrogen.

6. A method according to claim 4, wherein the manganese salt is $MnSO_4$ or $MnCO_3$.

* * * * *